US008798035B1

(12) United States Patent
Passe et al.

(10) Patent No.: US 8,798,035 B1
(45) Date of Patent: Aug. 5, 2014

(54) CONTROLLED ENVIRONMENT FACILITY CALLING SERVICES USING VOICE OVER INTERNET PROTOCOL INFRASTRUCTURE

(75) Inventors: Scott D. Passe, Forney, TX (US); Luke Keiser, Frisco, TX (US)

(73) Assignee: Securus Technologies, Inc., Dallas, TX (US)

( * ) Notice: Subject to any disclaimer, the term of this patent is extended or adjusted under 35 U.S.C. 154(b) by 1778 days.

(21) Appl. No.: 11/831,764

(22) Filed: Jul. 31, 2007

(51) Int. Cl.
*H04L 12/66* (2006.01)

(52) U.S. Cl.
USPC .................... 370/352; 370/252; 379/88.17

(58) Field of Classification Search
USPC ...................................................... 379/88.17
See application file for complete search history.

(56) References Cited

U.S. PATENT DOCUMENTS

| | | | |
|---|---|---|---|
| 4,935,956 A | 6/1990 | Hellwarth et al. | |
| 5,319,702 A | 6/1994 | Kitchin et al. | |
| 5,535,261 A | 7/1996 | Brown et al. | |
| 5,539,812 A | 7/1996 | Kitchin et al. | |
| 5,655,013 A | 8/1997 | Gainsboro | |
| 5,805,685 A | 9/1998 | McFarlen | |
| 6,064,963 A | 5/2000 | Gainsboro | |
| 6,501,837 B1 * | 12/2002 | Adler et al. | 379/210.01 |
| 6,639,977 B1 | 10/2003 | Swope et al. | |
| 6,665,293 B2 * | 12/2003 | Thornton et al. | 370/352 |
| 6,665,376 B1 | 12/2003 | Brown | |
| 6,788,674 B1 * | 9/2004 | Karamchedu et al. | 370/352 |
| 7,079,636 B1 | 7/2006 | McNitt et al. | |
| 7,079,637 B1 | 7/2006 | McNitt et al. | |
| 7,136,471 B2 | 11/2006 | Johnson | |
| 7,711,366 B1 * | 5/2010 | O'Neil et al. | 455/438 |
| 8,064,580 B1 * | 11/2011 | Apple et al. | 379/114.14 |
| 2002/0122417 A1 * | 9/2002 | Miller et al. | 370/352 |
| 2002/0177466 A1 * | 11/2002 | Laurila et al. | 455/552 |
| 2003/0123435 A1 * | 7/2003 | Yeom et al. | 370/352 |
| 2004/0218748 A1 * | 11/2004 | Fisher | 379/221.01 |
| 2005/0238160 A1 * | 10/2005 | Sunstrum | 379/220.01 |
| 2005/0265322 A1 * | 12/2005 | Hester | 370/352 |
| 2005/0286711 A1 * | 12/2005 | Lee et al. | 379/399.01 |
| 2006/0187900 A1 * | 8/2006 | Akbar | 370/352 |
| 2006/0285650 A1 * | 12/2006 | Hodge | 379/32.01 |
| 2007/0003026 A1 * | 1/2007 | Hodge et al. | 379/88.1 |
| 2007/0116214 A1 * | 5/2007 | Kitchin et al. | 379/111 |
| 2007/0167157 A1 * | 7/2007 | Hundal | 455/426.1 |
| 2007/0263812 A1 * | 11/2007 | Polozola et al. | 379/144.02 |
| 2008/0046580 A1 * | 2/2008 | Lafuente et al. | 709/229 |
| 2008/0298348 A1 * | 12/2008 | Frame et al. | 370/352 |

(Continued)

OTHER PUBLICATIONS

U.S. Appl. No. 09/905,014, Spadaro et al.

(Continued)

*Primary Examiner* — Duc C Ho
(74) *Attorney, Agent, or Firm* — Fogarty, L.L.C.

(57) ABSTRACT

Systems and methods which utilize existing, or otherwise available, voice over Internet protocol (VoIP) infrastructure for providing calling services with respect to controlled environment facilities, while continuing to implement a desired level of call mastering, are shown. VoIP infrastructure utilized according to embodiments may be provided by various alternative carriers, such as may have initially have been deployed for providing reduced rate calling services to individual users. Where possible, a call processor adapted according to embodiments may implement some of the same call mastering functions with respect to calls using VoIP infrastructure links as for more traditional call using PSTN links. However, embodiments additionally or alternatively implement functions uniquely tailored to the use of VoIP links. Embodiments allow user selection of the use of VoIP infrastructure.

52 Claims, 3 Drawing Sheets

(56) References Cited

U.S. PATENT DOCUMENTS

| | | | |
|---|---|---|---|
| 2009/0040968 A1* | 2/2009 | Kusnitz et al. | 370/328 |
| 2009/0067604 A1* | 3/2009 | Apple et al. | 379/207.04 |
| 2010/0248719 A1* | 9/2010 | Scholaert | 455/434 |
| 2011/0184746 A1* | 7/2011 | Kwon | 705/1.1 |

OTHER PUBLICATIONS

U.S. Appl. No. 10/135,878, Viola et al.
U.S. Appl. No. 10/642,532, Robert L. Rae.
U.S. Appl. No. 10/720,848, Viola et al.
U.S. Appl. No. 10/804,473, Rae et al.
U.S. Appl. No. 11/334,522, Charles Chow.
U.S. Appl. No. 11/338,868, Rogers et al.
U.S. Appl. No. 11/403,547, Rae et al.
U.S. Appl. No. 11/479,990, Sidler et al.
U.S. Appl. No. 11/480,335, Polozola et al.
U.S. Appl. No. 11/516,680, Mudd et al.
U.S. Appl. No. 11/603,960, John S. Hogg, Jr.

* cited by examiner

CONTROLLED ENVIRONMENT FACILITY CALLING SERVICES USING VOICE OVER INTERNET PROTOCOL INFRASTRUCTURE

CROSS-REFERENCE TO RELATED APPLICATIONS

The present application is related to co-pending and commonly assigned U.S. patent application Ser. No. 10/135,878 entitled "Information Management and Movement System and Method," filed Apr. 29, 2002, Ser. No. 10/606,011 entitled "Computer Based Method and Apparatus for Controlling, Monitoring, Recording and Reporting Telephone Access," filed Jun. 24, 2003, issued as U.S. Pat. No. 7,248,680, Ser. No. 11/102,440 entitled "Computer Based Method and Apparatus for Controlling, Monitoring, Recording and Reporting Telephone Access," filed Apr. 8, 2005, Ser. No. 11/516,680 entitled "System and Method for Call Treatment," filed Sep. 6, 2006, Ser. No. 11/338,868 entitled "Systems and Methods for Transaction and Information Management," filed Jan. 24, 2006, Ser. No. 11/480,335 entitled "Systems and Methods for Multimedia Visitation," filed Jun. 30, 2006, Ser. No. 09/905,014 entitled "Public Telephone with Voice Over Internet Protocol Transmission," filed Jul. 13, 2001, issued as U.S. Pat. No. 7,505,406, Ser. No. 10/642,532 entitled "Centralized Call Processing," filed Aug. 15, 2003, issued as U.S. Pat. No. 7,899,167, and Ser. No. 10/800,473 entitled "Call Processing with Voice Over Internet Protocol Transmission," filed Mar. 15, 2004, issued as U.S. Pat. No. 8,000,269, Ser. No. 11/403,547 entitled "Unauthorized Call Activity Detection and Prevention Systems and Methods for a Voice Over Internet Protocol Environment," filed Apr. 13, 2006, issued as U.S. Pat. No. 7,916,845, Ser. No. 11/603,960 entitled "Systems and Methods for Detecting a Call Anomaly Using Biometric Identification," filed Nov. 22, 2006, Ser. No. 11/334,522 entitled "System and Method for Keyword Detection in a Controlled Environment Facility Using a Hybrid Application," filed Jan. 18, 2006, issued as U.S. Pat. No. 7,860,722, Ser. No. 10/720,848 entitled "Information Management and Movement System and Method," filed Nov. 24, 2003, and Ser. No. 11/479,990 entitled "Systems and Methods for Acquiring, Accessing, and Analyzing Investigative Information," filed Jun. 30, 2006, issued as U.S. Pat. No. 7,860,222, the disclosures of which are hereby incorporated herein by reference.

TECHNICAL FIELD

The present invention relates generally to providing calling services with respect to controlled environment facilities and, more particularly, to utilizing voice over Internet protocol infrastructure for providing such calls.

BACKGROUND OF THE INVENTION

Call processing systems for facilitating and controlling calls with respect to penal institutions, prisons, and jails (each an example of a controlled environment facility, and which are collectively referred to herein as penal institutions) are known. For example, U.S. Pat. No. 4,935,956 entitled "Automated Public Phone Control for Charge and Collect Billing" and U.S. Pat. No. 6,639,977, the disclosures of which are incorporated herein by reference, disclose call processing systems for facilitating charge and collect-calls made from penal institutions. Such call processing systems operate to allow an inmate to place a call to a location external to the penal institution and to bill charges associated with the call to an account other than that associated with the calling line, all without live operator assistance. Accordingly, such call processing systems provide an efficient and expedient means by which calls may be placed, thus reducing costs associated with such calls.

Call processing systems used to facilitate calls from penal institutions generally not only need to provide efficient and expedient call completion, but also must provide some level of call control or other features, such as to prevent calls to particular parties, to prevent communication of prohibited or controlled information, to record the call, etcetera. For example, U.S. Pat. No. 7,079,636 entitled "Three-Way Silence Detect," number U.S. Pat. No. 7,079,637 entitled "System and Method for Detecting Unauthorized Call Activities," U.S. Pat. No. 7,136,471 entitled "Method and Apparatus for Detecting a Secondary Destination of a Telephone Call Based on Changes in the Telephone Signal Path," U.S. Pat. No. 5,539,812 entitled "Method and Apparatus for Detecting an Attempted Three-Way Conference Call on a Remote Telephone," U.S. Pat. No. 5,319,702 entitled "Method and Apparatus for Detecting and Responding to Hook Flash Events Occurring on a Remote Telephone," and U.S. Pat. No. 5,805,685 entitled "Three-Way Call Detection by Counting Signal Characteristics," the disclosures of which are incorporated herein by reference, each provide techniques useful for controlling the termination point of calls. U.S. Pat. No. 6,064,963 entitled "Automatic Key Word or Phrase Speech Recognition for the Corrections Industry," U.S. Pat. No. 5,535,261 entitled "Selectively Activated Integrated Real-Time Recording Telephone Conversations," U.S. Pat. No. 6,665,376 entitled "Selectively Activated Integrated Real-Time Recording of Telephone Conversations with Automated Documentation Consent," and U.S. Pat. No. 5,655,013 entitled "Computer-Based Method and Apparatus for Controlling, Monitoring, Recording and Reporting Telephone Access," the disclosures of which are incorporated herein by reference, each provide techniques for monitoring calls. The monitoring and/or control provided by such techniques is often desired, and often required, by the penal institutions, various governmental entities, the victims of crimes, etcetera. Accordingly, call processing systems used with respect to penal institution calling often include specialize functions for controlling and monitoring calls.

The aforementioned call processing systems are coupled to the public switched telephone network (PSTN) and control initiation and termination of calls over the PSTN. Recently, other networks have been used, at least on a limited basis, to carry calls. For example, techniques for placing voice over internet protocol (VoIP) calls have been developed, allowing packet networks (i.e., unswitched data networks) to be utilized in a call path. Using the infrastructure provided by alternative carriers, such as Skype Limited and JaJah, Inc., a caller can place or receive calls using VoIP links. However, the use of such VoIP links often requires equipment and/or processes outside of those associated with the use of typical telephones. For example, placing a call using Skype Limited's VoIP infrastructure typically involves a multimedia computer as a termination device at one or both ends of the call. Although the JaJah, Inc. VoIP infrastructure facilitates calls between two standard telephones, initiating the call requires a computer interface to provide information regarding the two telephones that are to be connected. Accordingly, the use of such VoIP infrastructure is not transparent to the user and is often not an option with respect to particular users.

In addition to the disadvantages with respect to the equipment and processes required to utilize the above mentioned. VoIP infrastructure, calls placed using the foregoing VoIP infrastructure often do not experience the quality of service expected from a carrier grade network. For example, the VoIP links typically utilize public networks, such as the Internet, wherein packet latency an other communication attributes are not within the control of the alternative carrier providing the VoIP infrastructure. Similarly, available bandwidth is typically allocated dynamically on such networks, thereby resulting in dropped packets and other audible communication degradation.

Despite the foregoing disadvantages, many users elect to use VoIP links provided by various alternative carriers in order to take advantage of the cost savings typically available. For example, many of the alternative carriers providing VoIP links offer free long distance, even free global, calling. Users are often willing to tolerate many disadvantages where the pricing structure is attractive.

Although it may be desirable to provide less costly calling with respect to penal institutions, the above mentioned call control and monitoring adds complexity and cost to the penal institution call processing systems. Moreover, such call control and monitoring functions are typically not compatible with a wide range of networks and network infrastructure. Accordingly, there has heretofore been no way to provide the cost advantages of alternative carrier VOW infrastructure links while providing call control and monitoring meeting the demands of penal institutions.

BRIEF SUMMARY OF THE INVENTION

The present invention is directed to systems and methods which utilize existing, or otherwise available, VoIP infrastructure for providing calling services, such as may include real-time communications, message delivery services, video conferencing, negotiated callback, etcetera, with respect to controlled environment facilities, such as penal institutions, camps, hospitals, dormitories, etcetera, while continuing to implement a desired level of call mastering. VoIP infrastructure utilized according to embodiments of the invention may be provided by various alternative carriers, such as may have initially have been deployed for providing reduced rate calling services to individual users. The use of such VoIP infrastructure in delivering calling services according to embodiments of the invention may be to provide lower overall costs of service delivery, to provide service penetration into additional markets, to accommodate the use of different forms of termination equipment, etcetera.

Embodiments of the invention provide call control and monitoring (collectively and separately referred to herein as "call mastering") to prevent calls to particular parties, to prevent implementation of particular enhanced calling features, to prevent communication of prohibited or controlled information, to record the call, etcetera with respect to calls associated with a controlled environment facility using VoIP infrastructure links. For example, where possible, a call processor adapted according to the present invention may implement some of the same call mastering functions with respect to calls using VoIP infrastructure links as for more traditional call using PSTN links. However, where particular call mastering functions are not effective with respect to VoIP links and PSTN links, embodiments of the invention implement functions uniquely tailored to the use of VoIP links. According to one embodiment, an alternative carrier's VoIP infrastructure may be adapted to provide the desired call mastering function, such as through the addition of control algorithms to the VoIP infrastructure. Additionally or alternatively, a call processor of the present invention may itself be adapted to provide call mastering functions uniquely tailored to the use of VoIP links.

An embodiment of the invention provides at least one call mastering function which is implemented differently with respect to calls using links provided by existing VoIP infrastructure and those using more traditional links provided by the PSTN. For example, a controlled environment call processor adapted according to the present invention may operate to monitor calls for a user invoking an enhanced calling service, such as three-way calling, and further process the call in response thereto, such as to terminate the call. However, the enhanced calling service may be invoked in different ways and/or the signaling observable by the call processing system may be different with respect to a VoIP link and that of a PSTN. Accordingly, the call processing systems of embodiments are adapted to implement monitoring and/or call control with respect to such an enhanced calling service differently with respect to a call placed over a VoIP link and a call placed over a PSTN link.

It should be appreciated that, although such different implementations may address a same event or situation, the results provided may be different with respect to each type of network. For example, better or more detailed information may be available with respect to one network or the other, allowing for more accurate control determinations. Accordingly, call control with respect to a call placed over one network may provide call control which "errors on the side of caution" due to uncertainty in a determination, and thus invokes a control feature (e.g., terminating a call) at a lower threshold than does call control with respect to a call placed over another network.

Embodiments of the invention allow user selection of the use of VoIP infrastructure. For example, a caller, such as an inmate in a penal institution, may be given the option of the call being placed over traditional PSTN links or VoIP links, such as to take advantage of cost savings or other differences associated with the use of VoIP infrastructure. Additionally or alternatively, a called party, such as a friend or family member of an inmate in a penal institution, may be given the option of calls being placed over traditional PSTN links or VoIP links. For example, although cost savings may be associated with the use of VoIP links, disadvantages such as latency, call control differences, etcetera, may result in particular users desiring not to have a call placed using VoIP infrastructure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
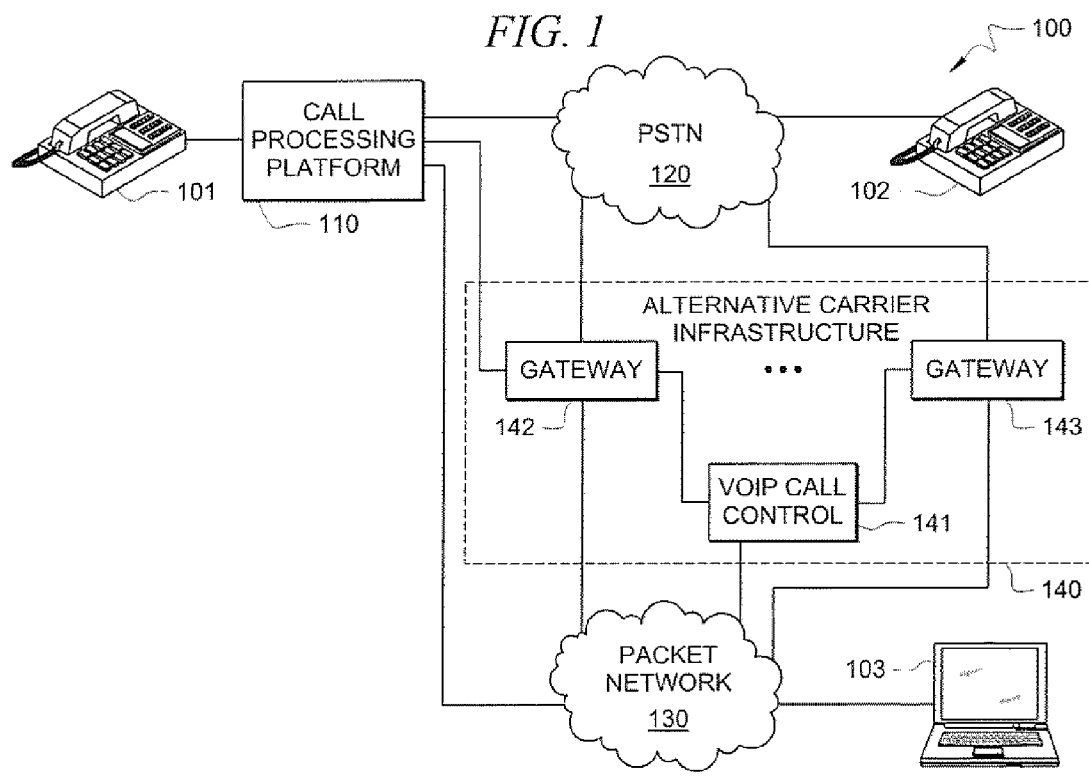
FIG. 1 shows a block diagram of a system adapted to facilitate calls using existing alternative carrier infrastructure according to an embodiment of the invention.

Directing attention to FIG. 1, a system adapted according to an embodiment of the invention to provide calling services with respect to controlled environment facilities using VoIP infrastructure is shown. Specifically, calling system 100 of the illustrated embodiment provides calling services, such as may include placing calls, receiving calls, accepting messages, delivering messages, delivery of information, etcetera, by and between user terminals 101-103. It should be appreciated that, although user terminals 101 and 102 are illustrated as telephones (e.g., plan old telephone service (POTS) or analog telephones) and user terminal 103 is illustrated as a laptop computer, a wide variety of user terminals may be supported according to embodiments of the invention. For example, user terminals utilized according to embodiments of the invention include cellular telephones, personal digital assistants (PDAs), computers with wireless network links, multi-media personal computers, processor-based kiosk terminals, two-way pagers, wireless e-mail devices, etcetera.

According to a preferred embodiment, one or more user terminals, represented by user terminal 101, are disposed within or in association with a controlled environment facility, such as a penal institution, a hospital, a camp, a school, a nursing home, a dormitory, etcetera, for use by persons therein, such as residents, inmates, personnel, patients, visitors, etcetera. Likewise, one or more user terminals, represented by user terminals 102 and 103, are disposed outside of or separate from a controlled environment facility. Various combinations of these user terminals may be utilized for providing communication with respect to a controlled environment facility. For example, a user within a controlled environment facility may utilize user terminal 101 to initiate or receive a call to/from either or both of user terminals 102 and 103. Similarly, a user outside of a controlled environment facility may utilize either or both of user terminals 102 and 103 to initiate or receive a call to/from user terminal 101.

Call processing platform 110 provides various call mastering functions with respect to calls associated with a controlled environment facility, such as calls made by or between user terminals 101-103. For example, call processing platform 110 may operate to identify a user, validate an account to be charged for calling services provided, determine if a call or any aspect thereof is permitted or not permitted (e.g., allowed/disallowed numbers, times of day, users, calling features, user terminals, etcetera), and control the call and aspects associated therewith (e.g., initiate call recording, provide notice of the call to an investigator, perform word searching to identify words and phrases of interest, etcetera). Detail with respect to embodiments of call processing platforms which provide call mastering functions and which may be adapted to facilitate calls using VoIP infrastructure according to the present invention is provided in the above referenced patent applications entitled "Information Management and Movement System and Method," "Computer Based Method and Apparatus for Controlling, Monitoring, Recording and Reporting Telephone Access," "Computer Based Method and Apparatus for Controlling, Monitoring, Recording and Reporting Telephone Access," "Systems and Methods for Acquiring, Accessing, and Analyzing Investigative Information," "System and Method for Call Treatment," "Systems and Methods for Transaction and Information Management," "Systems and Methods for Multimedia Visitation," "Public Telephone with Voice Over Internet Protocol Transmission," "Centralized Call Processing," and "Call Processing with Voice Over Internet Protocol Transmission."

It should be appreciated that call processing platform 110 may be disposed locally or remotely with respect to a controlled environment facility for which calling services are provided. Moreover, call processing platform 110 may be disposed in a distributed architecture, if desired. Various embodiments providing local, remote, and distributed call processing platform configurations are shown in the aforementioned, above referenced patent applications.

Call processing platform 110 of the illustrated embodiment is coupled to public switched telephone network (PSTN) 120, and thus is able to provide calling services using traditional PSTN links. Moreover, call processing platform 110 is adapted to interact with alternative carrier infrastructure 140, and thus is able to provide calling services using VoIP links.

According to a preferred embodiment alternative carrier infrastructure 140 is deployed by an alternative carrier to provide calling services, such as free or fiat rate long distance or global calling to individuals. For example, infrastructure provided by Sky Limited, JaJah, Inc., or similar VoIP calling services providers may be utilized by a call processing platform adapted according to embodiments of the invention. It should be appreciated that the use of such alternative carrier infrastructure may require the use of a particular interface or protocol, such as a digital interface or an internet protocol, and/or unique procedures or processes, such as to initiate a call, to terminate a call, to invoke an enhanced calling service, etcetera. Accordingly, call processing platform 110 of embodiments is adapted to interface with and/or interact with alternative carrier infrastructure 140.

For example, JaJah, Inc.'s VoIP infrastructure provides a PSTN termination point to PSTN termination point connection using a VoIP link between. Such infrastructure utilizes a data connection for initiating a call. Specifically, a calling party interfaces with a VoIP call control processor, such as VoIP call control 141, using a processor-based system and browser interface to identify both a calling number (i.e., a telephone number at which the caller wishes to place the call) and a called number (i.e., a telephone number to which the call is to be placed). Thereafter, the VoIP call control processor controls gateways, such as gateways 142 and 143, to establish calls to the calling and called numbers through the PSTN and connects the calls through a packet network, such as packet network 130 (e.g., the Internet, a wide area network (WAN), etcetera). The particular gateways selected for use by the VoIP call control processor are preferably disposed somewhat locally to their respective termination points, such that local calls (or a minimal toll calls) are placed through the PSTN and long distance communication is provided by the packet network.

Skype Limited's VoIP infrastructure, as another example, provides a VoIP termination point to PSTN termination point connection. Such infrastructure initiates calls using a multimedia computer system (e.g., a system including a microphone and speaker) operating under control of a client application. Accordingly, a user would typically execute client software on a multi-media computer system which interfaces with a VoIP call control processor, such as VoIP call control 141, via a packet network, such as packet network 130, to input a called number. Thereafter, the VoIP call control processor controls a gateway, such as either of gateways 142 and 143, to establish a call to the called number through the PSTN and connects the call to the caller's multi-media computer system through the packet network. Like the above example, the particular gateway selected for use by the VoIP call control processor is preferably disposed somewhat locally to the called termination point, such that local calls (or a minimal toll call) is placed through the PSTN and long distance communication is provided by the packet network.

Accordingly, call processing platform 110 of embodiments of the invention is adapted to interact with VoIP infrastructure so as to facilitate calls using VoIP links provided thereby. Such adaptation may include hardware adaptation, such as to provide appropriate physical interfaces to the VoIP infrastructure (e.g., digital data communication interfaces), and/or software adaptation, such as to provide control algorithms for interacting with the VoIP infrastructure (e.g. software control code).

Figure 2:
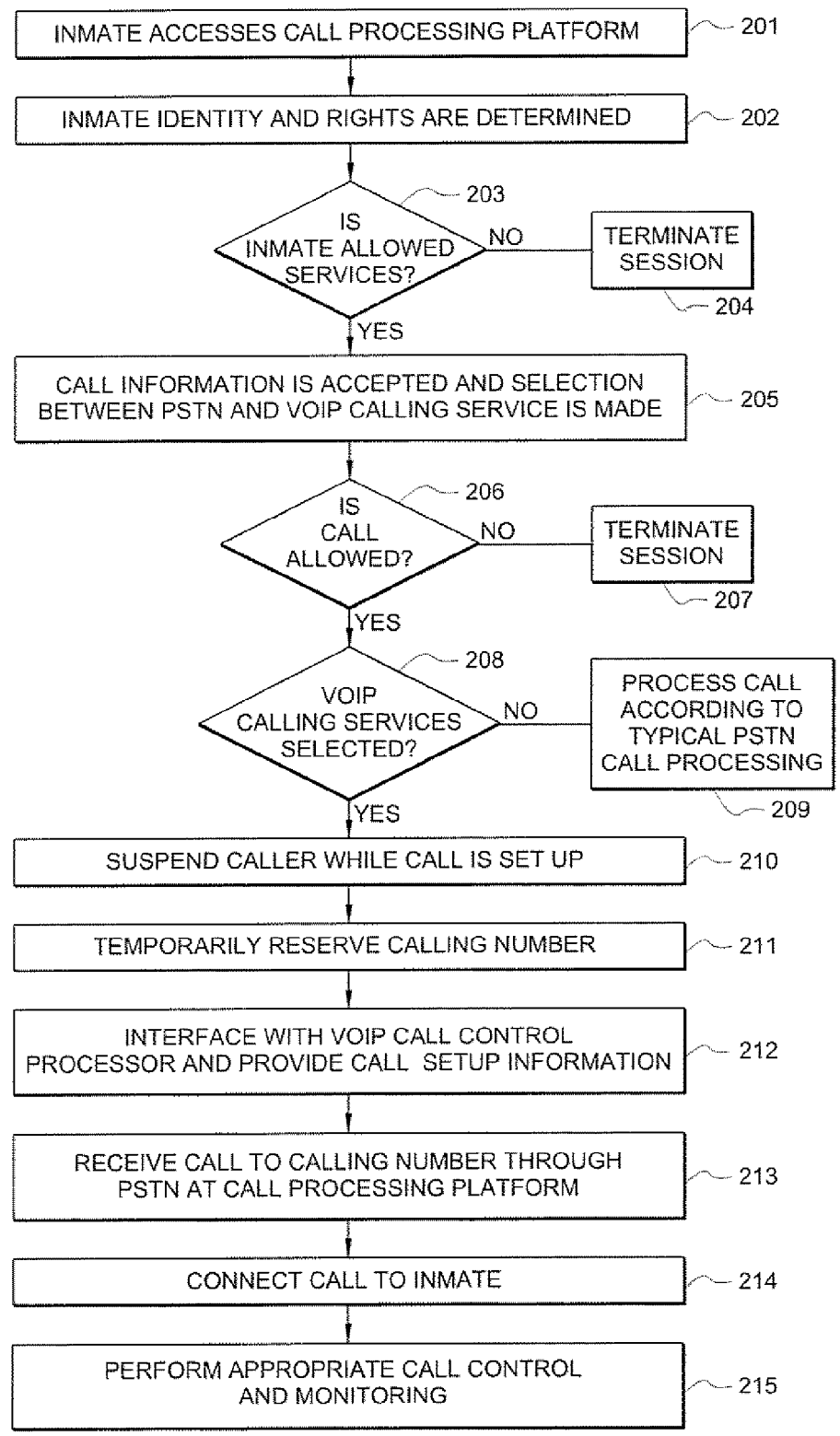
FIGS. 2 and 3 show flow charts of operation of methods for facilitating calls using alternative carrier infrastructure according to embodiments of the invention.

Directing attention to FIG. 2, a flow diagram showing operation of an embodiment of call processing platform 110 to interact with VoIP infrastructure which provides a PSTN termination point to PSTN termination point connection using a VoIP link between. At block 201 of the illustrated embodiment, an inmate accesses the call processing platform. For example, an inmate may operate user terminal 101 to interface with call processing platform 110. Although exemplary embodiments are described herein with reference to an inmate and penal institutions for clarity of the example described, it should be appreciated that the concepts of the present invention may be applied to use with respect to various users and various types of controlled environment facilities.

It should be appreciated that, although operation of the embodiment of FIG. 2 as described herein is for providing calling services, call processing platform 110 may provide services in addition to or in the alternative to calling services, such as the commissary and other transaction services shown in the above referenced patent application entitled "Systems and Methods for Transaction and Information Management." Moreover, it should be appreciated that calling services provided according to embodiments of the invention are not limited to placing two termination points in communication, and may include such services as message delivery services, video conferencing, negotiated callback, etcetera.

At block 202 of the illustrated embodiment, the inmate's identity and rights are determined. For example, a personal identification number, biometric information (e.g., voice print, finger print, iris scan, etcetera) may be used to identify the inmate. Such identification information may be utilized to access one or more databases to determine the particular user's rights with respect to services provided by call processing platform. Such rights may include the ability to use the system for calling services, limitations on days and times of such services, limitations on the particular persons or numbers called, etcetera. At block 203 a determination is made as to whether the inmate is allowed services. If the inmate is determined not to be allowed services, the illustrated embodiment proceeds to block 204 wherein the inmate's session is terminated. If however, the inmate is determined to be allowed services, processing according to the illustrated embodiment proceeds to block 205.

At block 205 of the illustrated embodiment, the inmate interacts with call processing platform 110 to make selections regarding the desired calling services and/or to provide information for facilitating the desired calling services. For example, call processing platform 110 may comprise voice response unit (VRU) functionality to query appropriate responses from the inmate. Additionally or alternatively, call processing platform 110 may provide a data interface, such as where user terminal 101 comprises a computer system (e.g., PDA, personal computer, processor-based kiosk terminal, etcetera). Irrespective of the particular user interface employed, the information provided by the inmate may include a called (dialed) number, an account to be billed for the calling services, information with respect to the type of call being placed (e.g., collect call, person-to-person call, etcetera), whether particular services are to be utilized (e.g., message service if the call is unanswered, caller ID information is to be transmitted or withheld, etcetera), and/or the like. Moreover, the inmate may provide information selecting the type of service desired, such as to select between a tradition PSTN call (e.g., to receive carrier quality communications, to experience little or no latency in the communications, to benefit from communications privacy associated with a switched connection, to communicate with a termination point which does not support VoIP connections, etcetera) and a VoIP call (e.g., to receive reduced charges for the call, to communicate with a termination point which does not support PSTN connections, etcetera).

It should be appreciated that, although the illustrated embodiment describes selection between PSTN and VoIP calling services, embodiments of the present invention may allow selection between additional or alternative infrastructure for providing services. For example, embodiments may allow selection of wireless links, such as provided by satellite or microwave communication infrastructure.

At block 206 of the illustrated embodiment, a determination is made with respect to whether a call requested by the inmate is allowed. For example, a called number provided by the inmate may be compared to an allowed number and/or prohibited number list, such as may have been accessed in block 202 above, in order to determine if calling services are to be provided to the inmate with respect to this called number. If it is determined that the call is not allowed, processing according to the illustrated embodiment proceeds to block 207 wherein the inmate's session is terminated. However, if it is determined that the call is allowed, processing according to the illustrated embodiment proceeds to block 208.

At block 208 of the illustrated embodiment, a determination is made with respect to whether VoIP calling services have been selected. For example, an inmate may have indicated a desire to use VoIP infrastructure in completing the call, calling and/or called party preferences (e.g. stored in a database of call processing platform 110) may indicate a desire to use VoIP infrastructure, algorithms of call processing platform 110 may determine that VoIP infrastructure should be used (e.g., for cost reduction, connection availability, etcetera), the called number may be available only using VoIP infrastructure, etcetera. If it is determined that VoIP calling services have not been selected, processing according to the illustrated embodiment proceeds to block 209 wherein typical PSTN call processing (e.g., call processing as provided for in the above referenced patent applications entitled "Information Management and Movement System and Method," "Computer Based Method and Apparatus for Controlling, Monitoring, Recording and Reporting Telephone Access," and "Systems and Methods for Acquiring, Accessing, and Analyzing Investigative Information") or other processing is provided. However, if it is determined that VoIP calling services have been selected, processing according to the illustrated embodiment proceeds to block 210.

At block 210 of the illustrated embodiment, calling interaction with the inmate is suspended while the desired call is set up using VoIP infrastructure. For example, the inmate may be placed on hold, various informational and/or commercial messages may be presented to the inmate, etcetera.

In order to facilitate the use of VoIP infrastructure which provides a PSTN termination point to PSTN termination point connection using a VoIP link between, block 211 of the illustrated embodiment temporarily reserves a telephone number or other address associated with call processing platform 110. For example, call processing platform 110 may have a plurality of unique telephone numbers associated with the links with PSTN 120, such as in a private branch exchange (PBX) arrangement. One such telephone number may be reserved for use in association with the calling services being provided to the inmate so as to associate an incoming call initiated by VoIP call control 141 when setting up the inmates desired call.

At block 212 of the illustrated embodiment, call processing platform 110 interfaces with alternative carrier infrastructure 140 in order to initiate a call using VoIP infrastructure. For example, call processing platform 110 may utilize a data interface to packet network 130 in order to communicate with VoIP call control 141 and provide call setup information, such as the called number, the temporarily reserved calling number, account information, etcetera. Call processing platform 110 may utilize algorithms operable to interface with alternative carrier infrastructure 140 in a manner native to the alternative carrier infrastructure (e.g., call processing platform 110 may operate to emulate browser interface interaction with VoIP call control 141).

At block 213 of the illustrated embodiment, call processing platform 110 receives a call from PSTN 120 directed to the temporarily reserved calling number which is initiated by VoIP call control 141. Call processing platform 110 preferably associates the received call with the inmate having requested the call, such as through the use of dialed number identification service (DNIS) information.

At block 214 of the illustrated embodiment, call processing platform 110 connects the call to the inmate, such as by completing a connection between user terminal 101 and a PSTN port at which the incoming call was received. Accordingly, user terminal 101 may be placed in communication with a corresponding user terminal (e.g., user terminal 102) associated with the dialed number through PSTN 120, alternative carrier infrastructure 140, and packet network 130. Specifically, user terminal 101 may be placed in communication with user terminal 102 through. PSTN 120, gateway 142, packet network 130, and gateway 143 (which again couples the call to PSTN 120).

Preferred embodiments of the invention provide the same or similar call mastering functions with respect to calls placed using VoIP links as those placed using other links, such as PSTN links. Accordingly, at block 215 of the illustrated embodiment appropriate call mastering is performed with respect to the call.

It should be appreciated that some or all of the aforementioned call mastering may be provided by call processing platform 110. For example, call processing platform 110 may utilize the same circuitry and algorithms for providing particular call mastering functions to calls using VoIP links as for calls using PSTN links. An example of a call monitoring and control feature which may be implemented the same by call processing platform 110 for calls using VoIP links and calls using PSTN links is word and phrase searching (such as shown and described in the above referenced patent application entitled "System and Method for Keyword Detection in a Controlled Environment Facility Using a Hybrid Application." In operation according to the embodiment illustrated in FIG. 1, each inmate call passes through call processing platform 110. Accordingly, irrespective of the particular links utilized to complete the call, call processing platform 110 may implement the same circuitry and algorithms for providing word and phrase searching. Of course, call mastering functions in addition to or in the alternative to the aforementioned word and phrase searching, such as investigative information processing (such as shown and described in the above referenced patent application entitled "Information Management and Movement System and Method"), call notification (such as shown and described in the above referenced patent application entitled "Systems and Methods for Acquiring, Accessing, and Analyzing Investigative Information"), etcetera, may be implemented by call processing platform 110 in a similar manner for calls using VoIP links and PSTN links.

The use of VoIP infrastructure, however, may introduce differences which render one or more call mastering function ineffective, or otherwise suggest adaptation should be made to accommodate the VoIP infrastructure. For example, three-way call detection techniques (such as those analyzing frequency and/or amplitude of signals at the calling party side of the network for hook flash events performed on the called party side of the network) developed for use with respect to traditional PSTN links may not operate as effectively with respect to signals which have been encoded and decoded for VoIP transmission. Accordingly, such detection techniques may be rendered less effective. Embodiments of the invention, therefore, adapt various call mastering functions for use with VoIP infrastructure.

Call mastering functions adapted for use with VoIP infrastructure according to embodiments of the invention may be provided by call processing platform 110. For example, algorithms and circuitry of call processing platform 110 providing a particular call mastering function with respect to calls using PSTN links may be adapted for use with respect to calls using VoIP links. Continuing with the above three-way call detection example, one or more parameters (such as a threshold for concluding that a three-way call is being attempted) may be altered for use with respect to calls using VoIP links. Accordingly, although the same algorithms and circuitry may be utilized with respect to calls using PSTN links and calls using VoIP links, the operation of such algorithms and circuitry may be different. According to a preferred embodiment, adaptation of such call mastering functions for use with calls using VoIP links provides call control which "errors on the side of caution" with respect to the VoIP link calls due to uncertainty in a determination, and thus invokes a control feature (e.g., terminating a call) at a lower threshold than does call control with respect to PSTN link calls. Users of such a system may be amenable to such a configuration as a "quid pro quo" for receiving the benefit of reduced cost calling.

Embodiments may additionally or alternatively implement different algorithms and circuitry for providing a particular call mastering function with respect to calls using PSTN links and VoIP links. Continuing with the above three-way call detection example, rather than implementing an altered version of the three-way signal processing used for PSTN links, an embodiment of the invention may implement a different three-way detection technique (such as the voiceprint techniques shown and described in the above referenced patent application entitled "Systems and Methods for Detecting a Call Anomaly Using Biometric Identification") providing improved operation with respect to the use of VoIP links. Embodiments of the invention may utilize combinations of such call mastering functions with respect to calls using PSTN links and/or VoIP links, if desired.

Of course, adaptation of call mastering functions for use with VoIP infrastructure need not only be made with respect to call processing platform 110 according to embodiments of the invention. Accordingly, embodiments of the invention provide adaptation of one or more components within PSTN 120, packet network 130, and/or alternative carrier infrastructure 140 to provide desired call mastering functions. Continuing with the aforementioned three-way call detection example, embodiments of the invention provide algorithms and/or circuitry (such as shown and described in the above referenced patent application entitled "Unauthorized Call Activity Detection and Prevention Systems and Methods for a Voice Over Internet Protocol Environment") on the called party side of the VoIP connection (e.g., within gateway 143) in order to process PSTN signals for three-way call detection.

Call mastering provided according to embodiments of the invention may involve direct adaptation and/or interaction with VoIP call control provided by alternative carrier infrastructure 140. Continuing again with the above three-way calling example, alternative carrier infrastructure 140 may provide for initiating a three-way call outside of signaling between user terminals 101 and 102, such as through a browser interfacing with VoIP call control 141 via packet network 130. Accordingly, in order to detect and/or prevent such three-way calls, VoIP call control 141 may be adapted to report and/or prevent attempts to invoke the three-way call feature, such as in response to command instructions provided to VoIP call control 141 by call processing platform 110 with the call setup information.

Although the embodiment illustrated in FIG. 2 interacts with VoIP infrastructure which provides a PSTN termination point to PSTN termination point connection using a VoIP link between, the present invention is not limited to operation with respect to such VoIP infrastructure. Directing attention to FIG. 3, a flow diagram showing operation of an embodiment of call processing platform 110 to interact with VoIP infrastructure which provides a VoIP termination point to PSTN termination point connection is provided as another example. Although blocks 301-310 of the embodiment illustrated in FIG. 3 define operation substantially the same as blocks 201-210 of FIG. 2, operation with respect to blocks 301-310 will be described briefly herein for completeness.

At block 301 of the illustrated embodiment, an inmate accesses the call processing platform. For example, an inmate may operate user terminal 101 to interface with call processing platform 110. At block 302, the inmate's identity and rights are determined. At block 303 a determination is made as to whether the inmate is allowed services. If the inmate is determined not to be allowed services, the illustrated embodiment proceeds to block 304 wherein the inmate's session is terminated. If, however, the inmate is determined to be allowed services, processing according to the illustrated embodiment proceeds to block 305.

At block 305 of the illustrated embodiment, the inmate interacts with call processing platform 110 to make selections regarding the desired calling services and/or to provide information for facilitating the desired calling services. At block 306, a determination is made with respect to whether a call requested by the inmate is allowed. If it is determined that the call is not allowed, processing according to the illustrated embodiment proceeds to block 307 wherein the inmate's session is terminated. However, if it is determined that the call is allowed, processing according to the illustrated embodiment proceeds to block 308.

At block 308 of the illustrated embodiment, a determination is made with respect to whether VoIP calling services have been selected. If it is determined that VoIP calling services have not been selected, processing according to the illustrated embodiment proceeds to block 309 wherein typical PSTN call processing or other processing is provided. However, if it is determined that VoIP calling services have been selected, processing according to the illustrated embodiment proceeds to block 310. At block 310 of the illustrated embodiment, calling interaction with the inmate is suspended while the desired call is set up using VoIP infrastructure.

At block 311 of the illustrated embodiment, call processing platform 110 interfaces with alternative carrier infrastructure 140 in order to initiate a call using VoIP infrastructure. For example, call processing platform 110 may utilize a data interface to packet network 130 in order to communicate with VoIP call control 141 and provide call setup information, such as the called number, account information, etcetera. Call processing platform 110 may utilize algorithms operable to interface with alternative carrier infrastructure 140 in a manner native to the alternative carrier infrastructure (e.g., call processing platform 110 may operate to emulate VoIP client interaction with VoIP call control 141).

It should be appreciated that alternative carrier infrastructure 140 may be limited with respect to the particular user terminals utilized with respect thereto. For example, alternative carrier infrastructure 140 may operate to initiate calls from a computer system operating under control of a VoIP calling client application. Accordingly, alternative carrier infrastructure 140 may not directly support calls placed from user terminal 101 where user terminal 101 comprises a standard telephone terminal. Accordingly, embodiments of the present invention include adaptation of call processing platform 110 to facilitate the use of such user terminals with alternative carrier infrastructure 140. For example, in addition to providing emulation of a VoIP calling client application in order to interact with VoIP call control 141 to set up a call, call processing platform 110 may include circuitry, such as a gateway, for interfacing a VoIP call with user terminal 101. Additionally or alternatively, call processing platform 110 may operate with external devices, such as gateway 142, to provide desired operation.

At block 312 of the illustrated embodiment, call processing platform 110 connects the call to the inmate, such as by completing a connection between user terminal 101 and a data port of call processing platform 110 which is coupled to packet network 130. Accordingly, user terminal 101 may be placed in communication with a corresponding user terminal (e.g., user terminal 102) associated with the dialed number through packet network 130, alternative carrier infrastructure 140, and PSTN 120. Specifically, user terminal 101 may be placed in communication with user terminal 102 through packet network 130, gateway 143, and PSTN 120.

Figure 3:
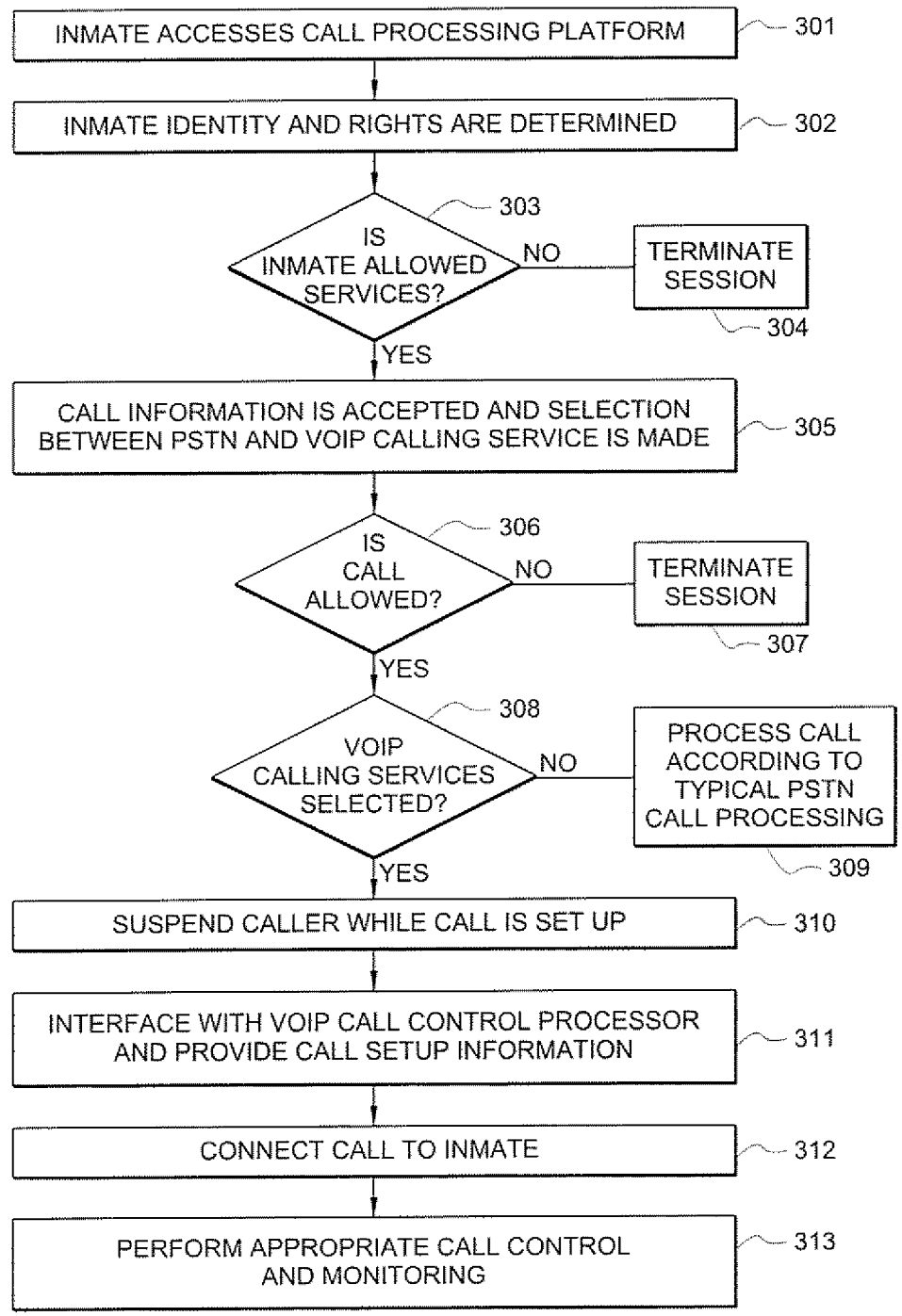

As with the embodiment of FIG. 2, the embodiment of FIG. 3 provides the same or similar call mastering functions with respect to calls placed using VoIP links as those placed using other links, such as PSTN links. Accordingly, at block 313 of the illustrated embodiment appropriate call mastering is performed with respect to the call.

Although the embodiments of FIGS. 2 and 3 have been discussed with reference to a calling party making a selection with respect to the use of VoIP infrastructure, embodiments of the present invention may additionally or alternatively provide a called party to make a selection with respect to the use of VoIP infrastructure. For example, in many situations wherein a call is placed from a controlled environment facility, the cost of the calling services may be borne by the called party (e.g., a collect call). Accordingly, the called party may have an interest in selecting attributes of the call, such as the use of VoIP infrastructure, which may provide cost savings. Likewise, the called party may have a preference for a higher quality call, such as to experience no latency, to reduce occurrences of termination of calls due to misidentified unauthorized calling activity, etcetera, and thus may have an interest in selecting attributes of the call, such as to avoid the use of VoIP infrastructure.

Accordingly, call processing platform 110 of embodiments of the invention operates to query a called party with respect to the use of VoIP infrastructure. For example, at a point prior to connecting the call with the calling party, such as when an announcement is made declaring the call is from a controlled environment facility and asking the called party if they wish to accept the charges, the called party may be asked if they would like to utilize VoIP infrastructure for providing this and/or subsequent calls. Querying the called party according to embodiments may provide information with respect to the advantages of the use of VoIP infrastructure, such as cost savings, and/or the disadvantages of the use of VoIP infrastructure, such as the possibility of lower quality calling service.

In operation according to a preferred embodiment, where a called party has not already indicated a preference with respect to the use of VoIP infrastructure, and either the calling party has selected the use of VoIP infrastructure or has not indicated a preference with infrastructure where possible in order to minimize costs associated with the call. The called party may then be queried as to their preference with respect to the use of VoIP infrastructure. If the called party indicates a preference not to use VoIP infrastructure, call processing platform 110 may terminate the call and reinitiate the call using PSTN links. Alternatively, call processing platform 110 may announce that future calls will be placed using PSTN links (preferably updating a user preference database of call processing platform 110 for use with respect to future calls), perhaps providing the current call at a reduced charge or even free to the called party.

Similarly, where a call has been placed to a called party without the use of VoIP infrastructure, but the called party selects to receive this call and/or future calls using VoIP infrastructure, call processing platform 110 may terminate the call and reinitiate the call using VoIP links. Alternatively, call processing platform 110 may announce that future calls will be placed using VoIP links (preferably updating a user preference database of call processing platform 110 for use with respect to future calls), perhaps providing the current call at a reduced charge or even free to the called party. A called party, for example, may have previously indicated a preference not to use VoIP infrastructure. However, the called party may subsequently decide that VoIP infrastructure should be used. The foregoing embodiment facilitates such changes in preferences.

Although embodiments have been described herein with reference to calling and/or called parties making selections with respect to whether VoIP infrastructure is to be used, further embodiments of the invention may operate to automatically make a determination with respect to the use of VoIP infrastructure. For example, where a particular user terminal at which the call is to terminate cannot support or be supported using a particular infrastructure, an alternative infrastructure may be automatically selected (or at least the unsupported infrastructure deselected) by call processing platform 110. Likewise, where a particular infrastructure is unavailable or malfunctioning, such as when all circuits are busy, call processing platform 110 may operate to automatically select an alternative infrastructure (or at least unselect the unavailable infrastructure).

Embodiments of the present invention facilitate the use of multiple alternative carrier infrastructures. For example, call processing platform 110 may be adapted to utilize both the alternative carrier infrastructure of FIG. 2 which provides a PSTN termination point to PSTN termination point connection using a VoIP link between and the alternative carrier infrastructure of FIG. 3 which provides a VoIP termination point to PSTN termination point connection. Selection between such alternative carrier infrastructure may be made by a user (e.g., calling or called party) or automatically (e.g., call processing platform 110). For example, a calling or called party may have a personal preference with respect to the use of an alternative carrier's infrastructure. Call processing platform 110 may select between alternative carrier infrastructure based upon such considerations as having a beneficial billing or service arrangement, providing service to a particular user terminal, having available capacity for carrying a call, etcetera.

Although embodiments have been discussed above with reference to calls between telephone user terminal configurations, calls may be placed to and/or from other configurations of user terminals. For example, the VoIP infrastructure of both Skype Limited and JaJah, Inc. support calls placed to computer terminals, such as using an IP address or pseudo telephone number assigned thereto. Call processing platform 110 of embodiments of the invention is adapted to establish calls to such devices.

Moreover, although embodiments have been described herein with respect to a calling party being disposed in a controlled environment facility, it should be appreciated that embodiments of the invention facilitate calls wherein a calling party is disposed outside of a controlled environment facility. For example, a user of user terminal 103 may place a VoIP call to user terminal 101. Call processing platform 110, preferably operable with signaling from VoIP call control 141, may receive the call and place user terminal 101 in communication with user terminal 103.

According to embodiments of the invention, call processing platform 110 of the illustrated embodiment serves as the base on which various of the above described operations may be performed. Accordingly, when implemented in software, elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the processor readable medium include an electronic circuit, a semiconductor compact disk CD-ROM, an optical disk, a hard disk, etcetera. The computer data signal may include any signal that can propagate over a transmission medium such as electronic network channels, optical fibers, air, electromagnetic, RF links, etcetera. The code segments may be downloaded via computer networks such as the Internet, an intranet, etcetera.

Figure 4:
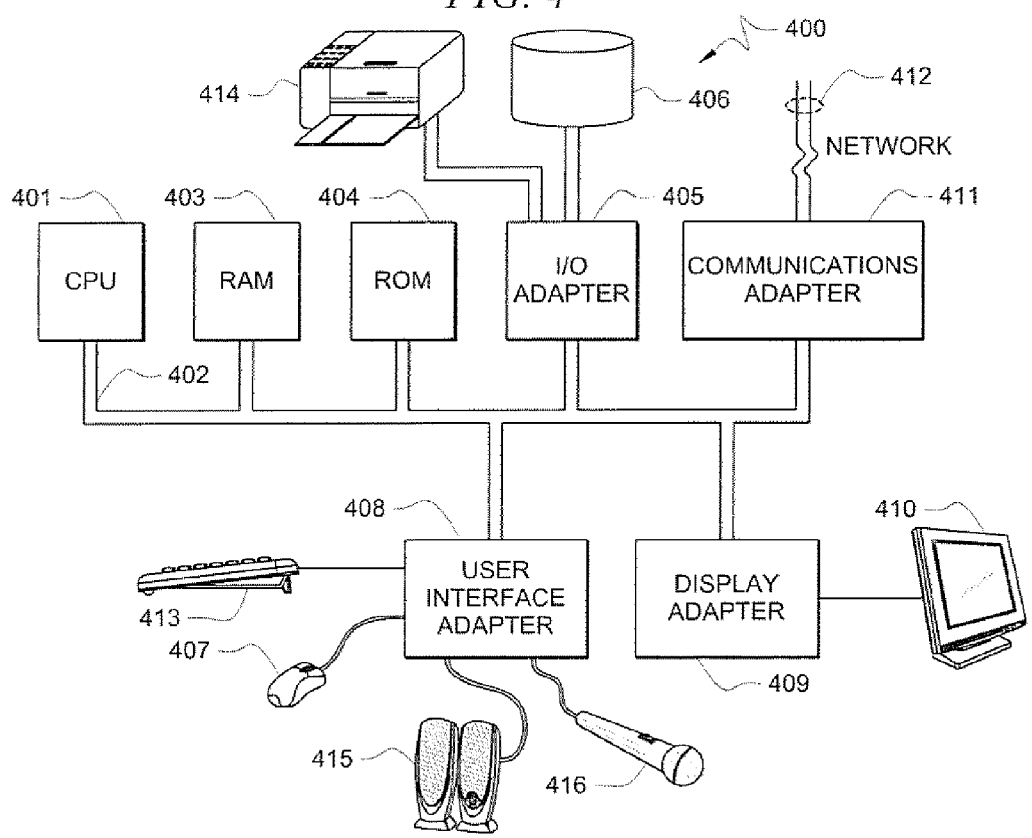
FIG. 4 shows a block diagram of a system adapted to provide a call processing platform according to embodiments of the invention.

FIG. 4 illustrates computer system 400, such as may correspond to call processing platform 110, adapted according to an embodiment of the present invention. Central processing unit (CPU) 401 is coupled to system bus 402. The CPU 401 may be any general purpose CPU, such as a processor from the Intel PENTIUM processor family, or a Motorola POW- ERPC processor. However, the present invention is not restricted by the architecture of CPU 401 as long as CPU 401 supports the inventive operations as described herein. Computer system 400 may be operating under control of an operating system such as Microsoft WINDOWS NT, or other release of the WINDOWS operating system, UNIX, LINUX, and the like.

Bus 402 of computer system 400 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art. Bus 402 is also coupled to input/output (I/O) controller 405, communications adapter 411, user interface adapter 408, and display adapter 409. The I/O adapter 405 connects to storage devices 406, such as one or more of a hard drive, a CD drive, a floppy disk drive, a tape drive, to the computer system. The I/O adapter 405 is also connected to printer 414, which would allow the system to print paper copies of information such as document, photographs, articles, etc. Note that the printer may a printer (e.g. dot matrix, laser, etcetera), a facsimile machine, or a copier machine. Communications adapter 411 is adapted to couple the computer system 400 to a network 412, which may be one or more of a telephone network, a LAN, a MAN, a WAN, the Internet, and/or the like. User interface adapter 408 couples user input devices, such as keyboard 413, pointing device 407, and microphone 416, to the computer system 400. User interface adapter 408 also provides sound output to a user via speaker(s) 415. Display adapter 409 is driven by CPU 401 to control the display on display device 410.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
   receiving a request from a calling party within a controlled-environment facility at a call processing platform to initiate a communication with a called party;
   prior to initiating said communication between said calling party and said called party, receiving an indication from said called party of whether said called party wishes to utilize a first network infrastructure or a second network infrastructure to establish said communication; and
   at least one of:
      if said called party indicates selection of said first network infrastructure, establishing a link under control of said call processing platform using said first network infrastructure to provide said communication between said calling party and said called party; or
      if said called party indicates selection of said second network infrastructure, establishing a link under control of said call processing platform using said second network infrastructure to provide said communication between said calling party and said called party; and
   wherein said indication is received in response to an announcement providing information to said called party explaining an advantage or a disadvantage of selecting said first or second network infrastructures.

2. The method of claim 1, wherein said indication is received in response to an announcement declaring that said communication is from said controlled-environment facility.

3. The method of claim 1, wherein said called party is disposed outside of said controlled-environment facility.

4. The method of claim 1, wherein said advantage includes a cost savings of said first or second network infrastructures.

5. The method of claim 1, wherein said disadvantage includes a lower quality service of said first or second network infrastructures.

6. The method of claim 1, wherein said communication is selected from the group consisting of: a telephone call, a video call, a messaging service, and an email.

7. The method of claim 1, wherein said call link is used in providing said communication associated with said controlled-environment facility.

8. The method of claim 1, wherein said call link is used in providing communications subsequent to said call associated with said controlled-environment facility.

9. The method of claim 1, wherein said first network infrastructure is public switched telephone network (PSTN) infrastructure and said second network infrastructure is voice over Internet protocol (VoIP) infrastructure.

10. The method of claim 9, wherein said VoIP infrastructure comprises VoIP infrastructure deployed for facilitating individual callers direct access to alternative carrier calling services.

11. The method of claim 10, wherein establishing said link using said second network infrastructure comprises:
    said call processing platform emulating user interaction with a VoIP call control system to initiate a VoIP link.

12. The method of claim 1, wherein said first network infrastructure is an analog infrastructure and said second network infrastructure is a digital infrastructure.

13. The method of claim 1, wherein said first network infrastructure is a switched connection infrastructure and said second network infrastructure is a logical connection infrastructure.

14. The method of claim 1, wherein said call processing platform provides call mastering functions for calls made with respect to said controlled environment facility, said call completed using said first or second network infrastructure being one call made with respect to said controlled environment facility.

15. The method of claim 14, wherein said call mastering functions provide same functions with respect to calls made using said first network infrastructure and calls made using said second network infrastructure.

16. The method of claim 14, wherein said call mastering functions comprise at least two functions from the group of functions consisting of enhanced calling service detection, call recording, and word searching with respect to call content.

17. The method of claim 14, wherein said call mastering functions include a set of call mastering functions which are implemented differently with respect to calls made using said first network infrastructure and calls made using said second network infrastructure.

18. The method of claim 17, wherein a call mastering function of said set implements a different decision criteria with respect to calls made using said first network infrastructure and calls made using said second network infrastructure.

19. The method of claim 18, wherein said different decision criteria results in a call mastering decision with respect to said calls made using said second network infrastructure that invokes a control feature at a lower threshold than a call mastering decision made with respect to said calls made using said first network infrastructure.

20. The method of claim 1, wherein said controlled environment facility comprises a penal institution.

21. A system, comprising:
a processor; and
a memory coupled to said processor, said memory including program instructions stored thereon that, upon execution by said processor, cause said system to:
establish a communication involving at least one user terminal located within a penal institution, wherein said communication is conducted over a public switched telephone network (PSTN) infrastructure or a voice over Internet protocol (VoIP) infrastructure as selected by a called party to the communication; and
provide a communication mastering function for said communication, wherein said communication mastering function is implemented differently with respect to: (i) communications made using said PSTN infrastructure without use of said VoIP infrastructure, and (ii) communications made using said VoIP infrastructure; and
wherein the selection is received in response to an announcement providing information to said called party explaining an advantage or a disadvantage of selecting said first or second network infrastructures.

22. The system of claim 21, wherein said VoIP infrastructure is provided for servicing users directly via a VoIP infrastructure user interface.

23. The system of claim 21, wherein said VoIP infrastructure provides a PSTN termination point to PSTN termination point connection using a VoIP link between.

24. The system of claim 23, wherein said at least one user terminal communicates using a VoIP communication link and wherein said program instructions, upon execution by said processor, further cause said system to convert PSTN signals to VoIP signals for coupling a link provided by said VoIP infrastructure to said at least one user terminal.

25. The system of claim 21, wherein said VoIP infrastructure provides a VoIP termination point to PSTN termination point connection.

26. The system of claim 25, wherein said at least one user terminal communicates using a PSTN communication link and wherein said program instructions, upon execution by said processor, further cause said system to convert VoIP signals to PSTN signals for coupling a link provided by said VoIP infrastructure to said at least one user terminal.

27. The system of claim 21, wherein said called party is disposed outside of said penal institution, and wherein said program instructions, upon execution by said processor, further cause said system to:
receive a request from a calling party operating the at least one user terminal within the penal institution to initiate said communication with said called party;
prior to establishment of said communication, receive said selection of PSTN or VoIP infrastructure from said called party; and
at least one of:
if said selection indicates the PSTN infrastructure, establish said communication using said PSTN infrastructure without use of said VoIP infrastructure; or
if said selection indicates the VoIP infrastructure, establish said communication using said VoIP infrastructure.

28. The system of claim 27, wherein said called party utilizes a user terminal disposed external to said penal institution.

29. The system of claim 21, wherein said program instructions, upon execution by said processor, further cause said system to provide same communication mastering functions with respect to communications made using said PSTN infrastructure without use of said VoIP infrastructure and communications made using said VoIP infrastructure.

30. The system of claim 29, wherein said communication mastering function comprises three-way calling service detection.

31. The system of claim 29, wherein said communication mastering function comprises remote call forwarding calling service detection.

32. The system of claim 21, wherein said communication mastering function comprises at least one of: enhanced calling service detection, call recording, or limitation of called numbers to which calls may be completed.

33. The system of claim 32, wherein said communication mastering function further comprises word searching with respect to communication content.

34. The system of claim 21, wherein said program instructions, upon execution by said processor, further cause said system to provide a first set of communication mastering functions which are implemented the same with respect to communications made using said PSTN infrastructure without use of said VoIP infrastructure and communications made using said VoIP infrastructure, and a second set of communication mastering functions which are implemented differently with respect to communications made using said PSTN infrastructure without use of said VoIP infrastructure and communications made using said VoIP infrastructure.

35. The system of claim 34, wherein a communication mastering function of said second set implements a different decision criteria with respect to communications made using said PSTN infrastructure without use of said VoIP infrastructure and communications made using said VoIP infrastructure.

36. The system of claim 35, wherein said different decision criteria results in a communication mastering decision with respect to said communications made using said VoIP infrastructure invokes a control feature at a lower threshold than a communication mastering decision made with respect to said communications made using said PSTN infrastructure.

37. The system of claim 34, wherein said second set of communication mastering functions comprise call control functions.

38. The system of claim 34, wherein said second set of communication mastering functions comprise call monitoring functions.

39. The system of claim 21, wherein said at least one user terminal comprises an analog telephone.

40. The system of claim 21, wherein said at least one user terminal comprises a computer.

41. The system of claim 21, wherein said at least one user terminal comprises a processor-based kiosk.

42. The system of claim 21, wherein said communication is selected from the group consisting of: a telephone call, a video call, a messaging service, and an email.

43. A method, comprising:
- providing communication control with respect to communications made between a resident of a controlled environment facility and a party outside of said controlled-environment facility, wherein said resident is operating a terminal located within said controlled-environment facility and said party is operating a terminal located outside of said controlled-environment facility, wherein said party is a called party, wherein said communication control is provided using a call processing platform, and wherein said controlled-environment facility comprises a penal institution; and
- allowing said party to select between one of: a public switched telephone network (PSTN) infrastructure or a voice over Internet protocol (VoIP) infrastructure for use in providing said communications, wherein said call processing platform is configured to interact with said party in allowing said party to select between use of said PSTN infrastructure and said VoIP infrastructure, wherein said communication control comprises providing communication mastering functions that are implemented differently with respect to communications made using said PSTN infrastructure without use of said VoIP infrastructure and communications made using said VoIP infrastructure, wherein a communication mastering function of a set of call mastering functions implements a different decision criteria with respect to communications made using said PSTN infrastructure without use of said VoIP infrastructure and communications made using said VoIP infrastructure, and wherein said different decision criteria results in a communication mastering decision with respect to said communications made using said VoIP infrastructure invoking a control feature at a lower threshold than a communication mastering decision made with respect to said communications made using said PSTN infrastructure, wherein the communication mastering decision is a detection of a three-way call based on the lower threshold, and wherein the invoked control feature is termination of the said communications.

44. The method of claim 43, wherein said communication control comprises controlling initiation of communications from said controlled-environment facility.

45. The method of claim 43, wherein said communication control comprises controlling initiation of communications having a termination point outside of said controlled-environment facility.

46. The method of claim 43, wherein said communication mastering functions provide same functions with respect to communications made using said PSTN infrastructure without use of said VoIP infrastructure and communications made using said VoIP infrastructure.

47. The method of claim 43, wherein said communication mastering functions comprise at least two functions from the group of functions consisting of enhanced calling service detection, call recording, and word searching with respect to communication content.

48. The method of claim 47, wherein said enhanced calling service detection comprises three-way calling service detection.

49. The method of claim 47, wherein said enhanced calling service detection comprises remote call forwarding calling service detection.

50. The method of claim 43, further comprising:
- storing information associated with said party, said information including selection of said PSTN infrastructure or said VoIP infrastructure for use with respect to providing subsequent communications.

51. The method of claim 43, further comprising:
- interacting, by said call processing platform, with a VoIP call control system to provide a VoIP link for said communications in accordance with selection of use of VoIP infrastructure by said party.

52. The method of claim 51, wherein said interacting comprises:
- emulating user operation to initiate a VoIP link.

\* \* \* \* \*